Oct. 26, 1926.  
A. N. PASMAN  
BALL COCK  
Filed June 9, 1926  
1,604,782
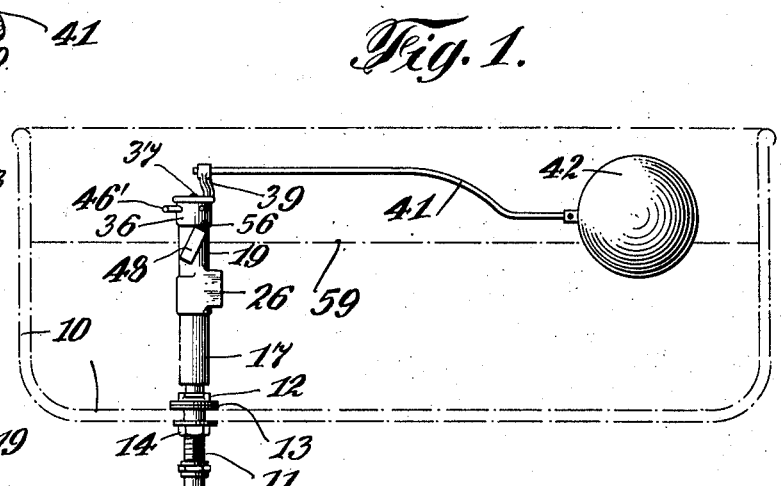
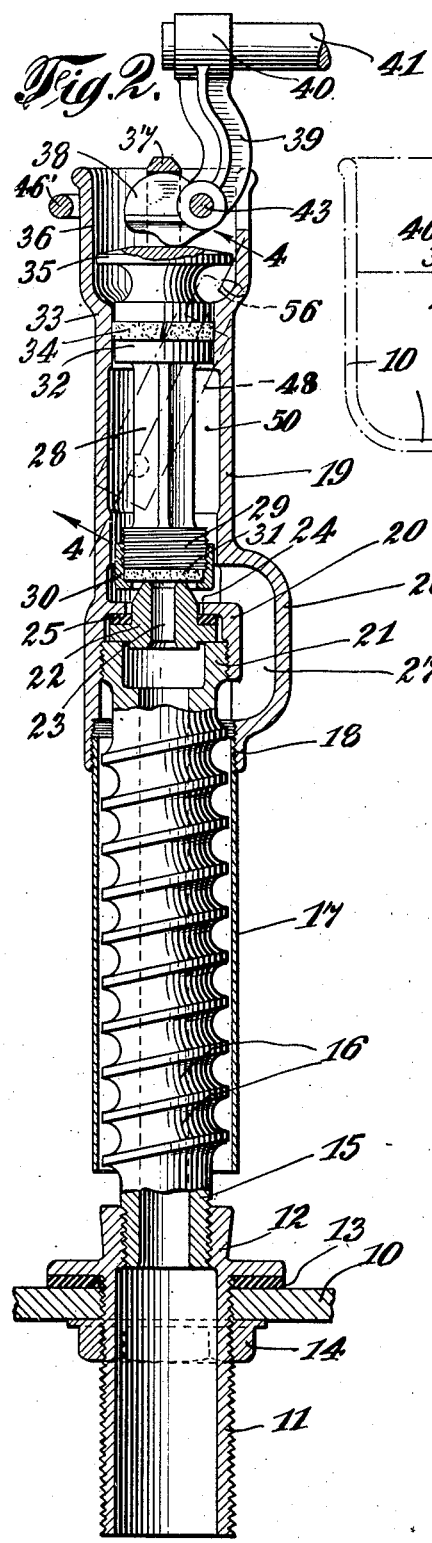
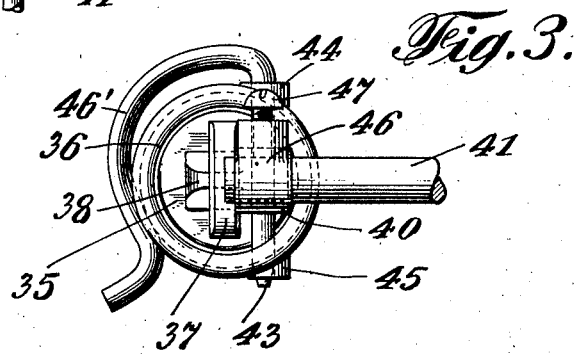
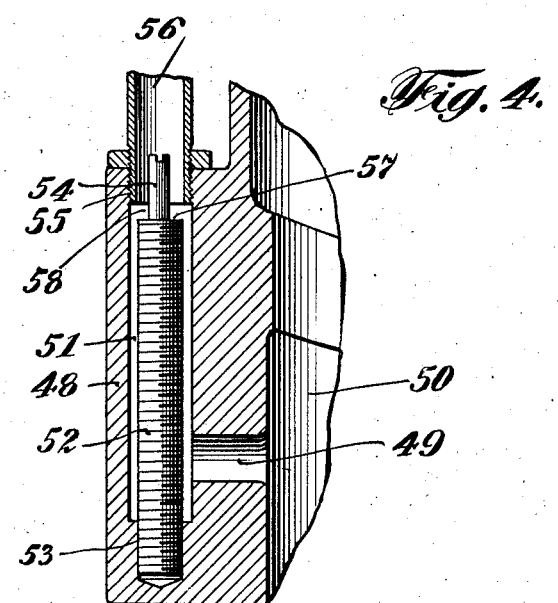
INVENTOR  
Abram N. Pasman  
BY  
ATTORNEYS Patented Oct. 26, 1926.

1,604,782

UNITED STATES PATENT OFFICE.

ABRAM N. PASMAN, OF WATERBURY, CONNECTICUT, ASSIGNOR TO SCOVILL MANUFACTURING COMPANY, OF WATERBURY, CONNECTICUT, A CORPORATION OF CONNECTICUT.

BALL COCK.

Application filed June 9, 1926. Serial No. 114,618.

My present invention relates to ball cocks adapted in use to control the admission of water to a tank or other receptacle for flushing closets, urinals, and similar fixtures where a predetermined flow of water is necessary for this purpose when required. The invention relates particularly to that type of ball cocks in which the device may be used in systems having a varying water pressure or in systems in which there are different water pressures so that the apparatus may be satisfactorily employed irrespective of the water pressure under which it operates. The ball cock furthermore, is of the type in which provision is made for providing a refill of the bowl or other fitting after the same has been flushed so that a certain quantity of water will remain within the bowl when the flushing operation is completed.

The object of my invention is the provision of a ball cock of the type to which reference has hereinbefore been made in which the parts are constructed to convey the water noiselessly to the tank and also to noiselessly convey the water to the bowl for the refill thereof. The parts of the apparatus are also so constructed as to reduce the water pressure against the operating valve immediately before the same is seated so as to make provision for a quick and positive seating of the valve. These and other features of the ball cock made in accordance with my invention will be hereinafter more particularly described.

In the drawing Figure 1 is an elevation illustrating the use of the ball cock made in accordance with this invention.

Fig. 2 is a central longitudinal section and partial elevation on an enlarged scale.

Fig. 3 is a plan of the upper end of the ball cock, and

Fig. 4 is a section on line 4—4, Fig. 2.

In the drawing I have illustrated the invention as applied to a tank such as is customarily employed for flushing a closet, urinal, or similar fitting. The walls of the tank are indicated at 10. The water is conveyed to the fitting by a supply pipe 11 connected to any suitable source of supply. As illustrated, this pipe 11 passes through an aperture provided therefor in the wall of the tank so that the fitting lies within the tank. Interiorly of the tank the pipe 11 has a flanged head 12 and lying between the same and the inner surface of the tank there is a gasket 13 for making a tight joint between the parts when drawn up to position by the use of a nut 14 applied exteriorly of the tank or otherwise.

The fitting as illustrated includes an inlet pipe 15 which at one end is screw threaded to be received in the flanged head 12 of the supply pipe and exteriorly is somewhat enlarged and provided with a spirally disposed groove 16. Surrounding the spirally grooved portion of the inlet pipe 15 is a sleeve 17. This is secured in position in the tapped end 18 of a valve casing 19. Within this valve casing 19 there is an internal wall 20 providing a socket which is tapped to receive and be connected to the head 21 of the inlet pipe 15. The socket provided in this wall also contains a valve seat member 22 provided with a centrally disposed port 23. A portion of this valve seat member extends through an aperture 24 provided for this purpose in the wall 20 and also within the socket formed by the wall 20 there is a gasket 25 for ensuring a water tight joint between the parts as herein just described. In that portion of the valve casing 19 in which the internal wall 20 is provided there is a rib or boss 26 making provision for a lateral passage or bypass chamber 27 around the exterior of the wall 20, and which opens into the sleeve 17.

Within the valve casing 19 there is a plunger member 28. At one end this plunger member is provided with a head 29 which is exteriorly screw threaded and adapted to receive a cap 30 and a valve 31, the valve being maintained in position by the cap and adapted to bear against the outer end of the valve seat member 22 which as will be understood forms a seat therefor to close the port 23 when the valve is seated. Adjacent its other or outer end the plunger is provided with a piston portion indicated at 32. This is adapted to operate in a cylinder section 33 of the valve casing and is fitted with a ring 34 which is preferably split as indicated so that it may expand to fit the cylinder and may also be readily placed in position and as readily removed and replaced when necessary. This extremity of the plunger member terminates in a knob 35 lying normally within the upper cup shaped end 36 of the valve casing and fitted with a yoke or bail 37.

The plunger member is actuated to open and close the valve by means of a lever and float valve. To this end as illustrated, an arm 38 lies within the oppositely disposed portions of the yoke 37 and is part of a lever 39. The lever 39 is provided with a socket 40 in which there is connected one end of a rod 41 which at its opposite end carries the float 42 which may be the customary hollow ball or otherwise. The lever 39 is pivotally connected to the cup shaped upper end of the valve casing by a pin 43 or otherwise. As illustrated, however, this construction is similar to that shown and described in Letters Patent No. 1,295,789 granted to me February 25, 1919. In this construction the pivot pin 43 passes through apertures provided therefor in lugs 44 and 45 in oppositely disposed but offset positions on the cup shaped end 36 and also through bearings 46 provided for this purpose on the lever 39. The outer end of the pivot pin as indicated at 46' is curved and when the pin is in position is adapted to snap over the peripheral lip of the cup shaped member 36 in order to maintain the pin in position and to thereby secure the lever 39 and the parts associated therewith in place. It will be understood, of course, that the lever 39 operates in a slot provided therefor in the cup shaped member 36. The rod 41 may be secured in position in the socket 40 by means of a set screw 47 or otherwise.

In addition to the parts of the structure as hereinbefore described, I also employ a device for supplying noiselessly a refill quantity of water to the bowl. To this end in a suitable position the valve casing 19 is provided with a rib 48. As illustrated, this rib is at an angle to the longitudinal axis of the valve casing, but as will be understood may be provided in any suitable position. In the wall of the valve casing 19 there is a port 49 making communication between the chamber 50 in the valve casing and a chamber 51 in the rib or boss 48. Lying within this chamber 51 there is a screw 52. The inner end of this screw 52 is adapted to be turned down in a tapped socket 53 at the inner end of the rib 48. The diameter of the chamber 51 is preferably greater than the diameter of the screw threaded body of the screw 52 so that there is an annular space surrounding the screw 52. The outer end of the screw 52 is of reduced diameter and the end of the rib 48 opposite that in which the tapped socket 53 is placed is tapped as indicated at 55 to receive the threaded end of a refill pipe 56. As indicated in Fig. 4 of the drawing, the reduced end 54 of the screw 52 extends a predetermined distance within the refill pipe 56 and this construction is preferred because it prevents or tends to prevent the breaking of the refill pipe when bending the same so as to connect the parts and lead the refill pipe to terminate within the bowl or other fixture to be flushed. It will also be observed that the screw 52 may be adjusted to place so that the space between the shoulder 57 at the reduced end 54 of the screw may provide for a space 58 of varying dimensions at the entrance to the refill pipe so as to regulate the admission thereto and thereby the flow of the water therethrough.

In the use of this apparatus the parts are normally in the position shown in Fig. 2 and are so maintained by the float ball 42 actuated by the liquid in the tank, the normal level of which for example is indicated by the dash and dot lines 59. When the discharge valve from the tank is open the water is permitted to flow therefrom to the fitting to be flushed. This causes the ball 42 to drop in the tank and to thereby operate the plunger 28 lifting the valve 31 from its seat. In so doing the water from the source of supply is permitted to flow through the supply pipe 11 to the inlet pipe 15 through the same to the valve seat member and through the port therein to the interior of the valve casing 19. The greater portion of this water as will be understood then flows by way of the by-pass 27 to the space between the sleeve 17 and the spirally disposed surface of the inlet pipe 15. Due to this spirally disposed surface and the sleeve 17 the course of the water is somewhat retarded and directed in a spiral path and furthermore is enclosed so as to pass to the tank in a manner which causes as little noise as possible, in fact, the noise usually caused by the rushing of the water is sufficiently far eliminated to be substantially inaudible. As the water passes in this manner into the tank it floats the ball 22 and thereby gradually returns the plunger in a downward direction to re-seat the valve. Due to the reduced cross section of the port 23 in the valve seat member the pressure against the valve immediately before the same comes to position against its seat is materially reduced whereby a quick and positive seating of the valve is obtained. It will also be apparent that as the valve seat member is removable and interchangeable, different valve seat members having ports of different diameter may be used in different systems operating under various pressures, the apparatus employed in each instance being fitted with a valve seat member having a port therein suitable for the pressure under which the apparatus is to operate.

The purpose of the piston 32 and the ring 34 associated therewith is to prevent the water which passes by the valve into the chamber 50 from passing into the upper cup shaped member of the valve casing. The water, however, which passes to the chamber 50 flows therefrom through the port 49 to the chamber 51 and thence to the refill pipe 56 and through the same to the bowl or other fitting to effect the refill therein after the flushing operation is completed. It will be observed that due to the screw threaded surface of the screw 52 a substantially noiseless action irrespective of the pressure is effected in the water flowing to the bowl to provide the refill, and furthermore, that this quantity of water may be regulated depending upon the pressure and the quantity for the refill pipe, by the adjustment of the position of the screw 52 to determine the extent of the space 58 between the shoulder 57 on the screw 52, and the inlet end of the refill pipe 56.

I claim as my invention:

1. In a ball cock, a casing having a chamber therein, a valve in the said chamber, a boss on the said casing having a chamber therein, a device within the chamber in the the boss providing an annular space therein, there being a communication between the chamber in the casing and the annular space in the boss, a re-fill pipe extending from the said boss and leading from the annular space therein, and means for operating the said valve.

2. In a ball cock, a casing having a chamber therein, a valve in the said chamber, a boss on the casing having a chamber therein opening through one end of the boss, a screw member lying within the chamber in the boss and providing an annular space therein, there being a passage between the chamber in the casing and the annular space in the boss, a re-fill pipe extending from the open end of the boss, and means for operating the said valve.

3. In a ball cock, a casing having a chamber therein, a valve in the said chamber, a boss on the casing having a chamber therein opening through one end of the boss, a screw member adjustable to position in a tapped socket at the other end of said boss, the said screw member lying within the chamber in the boss and providing an annular space therein, there being a passage between the chamber in the casing and the annular space in the boss, a re-fill pipe extending from the open end of the boss, and means for operating the said valve.

4. In a ball cock, a casing having a chamber therein, a valve in the said chamber, a boss on the said casing having a chamber therein opening through one end of the boss, a screw adjustable to position at one end in a tapped socket provided therefor in the said boss, the said screw lying within the chamber in the boss and providing an annular space therein and also having an outer end of reduced diameter, there being a passage between the chamber in the casing and the annular space in the boss, a re-fill pipe secured at one end in the open end of the boss and into which the reduced end of the screw extends, and means for operating the said valve.

5. In a ball cock, a casing having an apertured internal wall forming a socket therein and a boss providing a by-pass chamber around the said socket, an inlet pipe secured at one end in the said socket, a valve seat member secured in position in the socket by the said inlet pipe in alignment with the aperture in said internal wall, a sleeve connected to the casing and surrounding a portion of the said inlet pipe, said sleeve communicating with said by-pass chamber, a valve adapted to bear against the said valve seat, and means for operating the said valve.

6. In a ball cock, a casing having an internal wall forming a socket therein and a boss providing a by-pass chamber around the said socket, an inlet pipe secured at one end in the said socket, a valve seat member secured in position in the socket by connecting the inlet pipe thereto and having a portion extending through an aperture in the wall forming the said socket, the said inlet pipe having a spirally grooved outer surface, a sleeve connected to the casing and surrounding the spirally grooved portion of the inlet pipe, said sleeve communicating with the said by-pass chamber, a plunger, a valve carried by the plunger for bearing against the said valve seat, and means for actuating the plunger to operate the valve.

7. In a ball cock, a casing having an internal wall forming a socket therein and a boss providing a by-pass chamber around the said socket, an inlet pipe secured at one end in the said socket, a valve seat member secured in position in the socket by connecting the inlet pipe thereto and having a portion extending through an aperture in the wall forming the said socket, the said inlet pipe having a spirally grooved outer surface, a sleeve connected to the casing and surrounding the spirally grooved portion of the inlet pipe, said sleeve communicating with the said by-pass chamber, a plunger, a valve removably connected to the plunger at one end thereof, a piston at the other end of the plunger operating in a cylindrical portion of the said casing, and means for actuating the plunger and the parts associated therewith to operate the said valve.

Signed by me this 24th day of May 1926.

ABRAM N. PASMAN.